US011095375B2

(12) United States Patent
Tanaka et al.

(10) Patent No.: US 11,095,375 B2
(45) Date of Patent: Aug. 17, 2021

(54) OPTICAL RECEIVER MODULE, OPTICAL RECEIVING METHOD, OPTICAL LINE TERMINAL, PON SYSTEM, AND OPTICAL FILTER

(71) Applicant: SUMITOMO ELECTRIC INDUSTRIES, LTD., Osaka (JP)

(72) Inventors: Naruto Tanaka, Osaka (JP); Tomoyuki Funada, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/624,073

(22) PCT Filed: Jun. 6, 2018

(86) PCT No.: PCT/JP2018/021654
§ 371 (c)(1),
(2) Date: Dec. 18, 2019

(87) PCT Pub. No.: WO2019/003833
PCT Pub. Date: Jan. 3, 2019

(65) Prior Publication Data
US 2020/0213011 A1 Jul. 2, 2020

(30) Foreign Application Priority Data
Jun. 27, 2017 (JP) .............................. JP2017-125254

(51) Int. Cl.
H04B 10/67 (2013.01)
H04B 10/69 (2013.01)
(Continued)

(52) U.S. Cl.
CPC ....... H04B 10/674 (2013.01); H04B 10/0777 (2013.01); H04B 10/0779 (2013.01);
(Continued)

(58) Field of Classification Search
CPC .......... H04B 10/073–0797; H04B 10/67–6973
(Continued)

(56) References Cited

U.S. PATENT DOCUMENTS 5,841,571 A * 11/1998 Terahara ................ H04B 10/67
359/341.41
8,259,390 B2 * 9/2012 Hoshi ................. H01S 3/06758
359/344
(Continued)

FOREIGN PATENT DOCUMENTS

JP 06260709 A * 9/1994
JP H06-260709 A 9/1994
(Continued)

Primary Examiner — Li Liu
(74) Attorney, Agent, or Firm — Faegre Drinker Biddle & Reath LLP

(57) ABSTRACT

An optical receiver module which receives a first optical signal including a continuous signal or a burst signal includes: a variable optical attenuator which adjusts the first optical signal to output a second optical signal; a semiconductor optical amplifier which amplifies the second optical signal to output a third optical signal; and a controller which controls an output of at least one of the variable optical attenuator and the semiconductor optical amplifier so as to cause the semiconductor optical amplifier to operate in a region in which gain saturation of the semiconductor optical amplifier does not occur, on the basis of at least one of: a power obtained by suppressing an outside portion of the wavelength band of the first optical signal in the third optical signal; and a power obtained by extracting the outside portion of the wavelength band of the first optical signal in the third optical signal.

6 Claims, 9 Drawing Sheets

(51) Int. Cl.
*H04B 10/272* (2013.01)
*H04B 10/25* (2013.01)
*H04B 10/077* (2013.01)
*H04B 10/27* (2013.01)
*H04B 10/079* (2013.01)

(52) U.S. Cl.
CPC ..... *H04B 10/0797* (2013.01); *H04B 10/0799* (2013.01); *H04B 10/07955* (2013.01); *H04B 10/25891* (2020.05); *H04B 10/27* (2013.01); *H04B 10/272* (2013.01); *H04B 10/673* (2013.01); *H04B 10/69* (2013.01)

(58) Field of Classification Search
USPC .................................................. 398/202–214
See application file for complete search history.

(56) References Cited

U.S. PATENT DOCUMENTS

| | | | | |
|---|---|---|---|---|
| 8,290,376 | B2* | 10/2012 | Oomori | H04B 10/6931 398/208 |
| 2003/0067677 | A1* | 4/2003 | Islam | B82Y 20/00 359/344 |
| 2003/0106990 | A1* | 6/2003 | Tomofuji | H04B 10/2942 250/214 LA |
| 2004/0062557 | A1* | 4/2004 | Takashima | H04B 10/674 398/209 |
| 2009/0237781 | A1* | 9/2009 | Hoshi | H04B 10/296 359/344 |
| 2011/0038632 | A1* | 2/2011 | Zou | H04Q 11/0067 398/72 |
| 2011/0243576 | A1* | 10/2011 | Oomori | H04B 10/674 398/208 |
| 2013/0004172 | A1* | 1/2013 | Sugawa | H04J 14/025 398/72 |
| 2013/0259479 | A1* | 10/2013 | Mizuguchi | H04B 10/50 398/65 |

FOREIGN PATENT DOCUMENTS

| | | |
|---|---|---|
| JP | 2004-120669 A | 4/2004 |
| JP | 2010-45606 A | 2/2010 |
| JP | 2012-19353 A | 1/2012 |
| JP | 2012-165127 A | 8/2012 |
| JP | 2013-12968 A | 1/2013 |
| JP | 2016-9897 A | 1/2016 |
| JP | 2016-58738 A | 4/2016 |

* cited by examiner

OPTICAL RECEIVER MODULE, OPTICAL RECEIVING METHOD, OPTICAL LINE TERMINAL, PON SYSTEM, AND OPTICAL FILTER

TECHNICAL FIELD

The present invention relates to an optical receiver module, an optical receiving method, an optical line terminal, a PON system, and an optical filter.

The present application claims priority on Japanese Patent Application No. 2017-125254 filed on Jun. 27, 2017, the entire content of which is incorporated herein by reference.

BACKGROUND ART

In optical communication, there are cases where a semiconductor optical amplifier (SOA) is provided in the middle of an optical transmission path. A variable optical attenuator (VOA) is disposed before the SOA according to need (see PATENT LITERATURE 1, for example). Due to the provision of the VOA, gain control of the SOA can be performed such that the pattern effect of an output waveform is suppressed and occurrence of an error floor is prevented.

For controlling a VOA, for example, when an optical input is branched immediately before the VOA, a controller having monitored an input power can appropriately control attenuation of the VOA (FIG. 3 of PATENT LITERATURE 1). Alternatively, an output of an SOA may be branched, and a controller having monitored an output power may appropriately control attenuation of the VOA (FIG. 4). Further, also shown are an example in which current fluctuation of an SOA is monitored and attenuation of the VOA is controlled (FIG. 5), and an example in which an input to an SOA is branched and monitored and clamp light is supplemented to the SOA (FIG. 8). Each of these relates to a downlink continuous signal from the optical line terminal to the optical network unit.

Since an uplink burst signal from the optical network unit to the optical line terminal has a difference in signal strength thereof in accordance with the distance, a technology in which: the uplink signal is branched by a relay in the middle of an optical transmission path; and the amplification rate of the SOA is controlled, is also proposed (see PATENT LITERATURE 2, for example). In this case, not only the power of light but also the wavelength of the light are monitored and control of the SOA in accordance with the wavelength is performed.

Meanwhile, instead of the optical branching, a technology in which: light is converted into an electric signal; then the signal is monitored; and feedback is provided to control of the SOA, is also proposed (see FIG. 2 of PATENT LITERATURE 3, for example).

CITATION LIST

Patent Literature

PATENT LITERATURE 1: Japanese Laid-Open Patent Publication No. 2012-19353

PATENT LITERATURE 2: Japanese Laid-Open Patent Publication No. 2016-9897

PATENT LITERATURE 3: Japanese Laid-Open Patent Publication No. 2012-165127

SUMMARY OF INVENTION (Optical Receiver Module)

An optical receiver module according to an aspect of the present invention is an optical receiver module configured to receive a first optical signal capable of including a continuous signal or a burst signal. The optical receiver module includes: a variable optical attenuator configured to adjust the first optical signal to output a second optical signal; a semiconductor optical amplifier configured to amplify the second optical signal to output a third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least a second power selected from between: a first power obtained by suppressing an outside portion of a wavelength band of the first optical signal in the third optical signal; and the second power obtained by extracting the outside portion of the wavelength band of the first optical signal in the third optical signal.

(Optical Receiving Method)

An optical receiving method according to an aspect of the present invention is an optical receiving method performed by an optical receiver module configured to receive an optical signal capable of including a continuous signal or a burst signal, to adjust power of the optical signal so as to have a predetermined value or lower, and to then amplify the power. The optical receiving method includes: estimating the power before the amplification thereof, on the basis of at least one of the amplified power and ASE noise included therein; and controlling, on the basis of an estimation result, at least one of a degree of the adjustment and a degree of the amplification so as to suppress gain saturation.

(Optical Line Terminal)

An optical line terminal according to an aspect of the present invention is an optical line terminal configured to communicate with a plurality of optical network units via an optical fiber. The optical line terminal includes, as a part thereof, an optical receiver module configured to receive a first optical signal capable of including a continuous signal or a burst signal. The optical receiver module includes: a variable optical attenuator configured to adjust the first optical signal to output a second optical signal; a semiconductor optical amplifier configured to amplify the second optical signal to output a third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least a second power selected from between: a first power obtained by suppressing an outside portion of a wavelength band of the first optical signal in the third optical signal; and the second power obtained by extracting the outside portion of the wavelength band of the first optical signal in the third optical signal.

(PON System)

A PON system according to an aspect of the present invention includes: a plurality of optical network units; an optical transmission path formed by an optical fiber; and an optical line terminal configured to communicate with the plurality of optical network units via the optical transmission path. The optical line terminal includes, as a part thereof, an optical receiver module configured to receive a first optical signal from the optical network units. The optical receiver module includes: a variable optical attenuator configured to adjust the first optical signal to output a second optical signal; a semiconductor optical amplifier configured to amplify the second optical signal to output a third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least a second power selected from between: a first power obtained by suppressing an outside portion of a wavelength band of the first optical signal in the third optical signal; and the second power obtained by extracting the outside portion of the wavelength band of the first optical signal in the third optical signal.

(Optical Filter)

An optical filter according to an aspect of the present invention includes: an input port configured to receive an output of an optical signal from a variable optical attenuator via a semiconductor optical amplifier; a first output port configured to output light obtained by suppressing an outside portion of a wavelength band of the optical signal in an optical input received at the input port; and a second output port configured to output light obtained by extracting the outside portion of the wavelength band of the optical signal in the optical input received at the input port.

DESCRIPTION OF EMBODIMENTS

Figure 1:
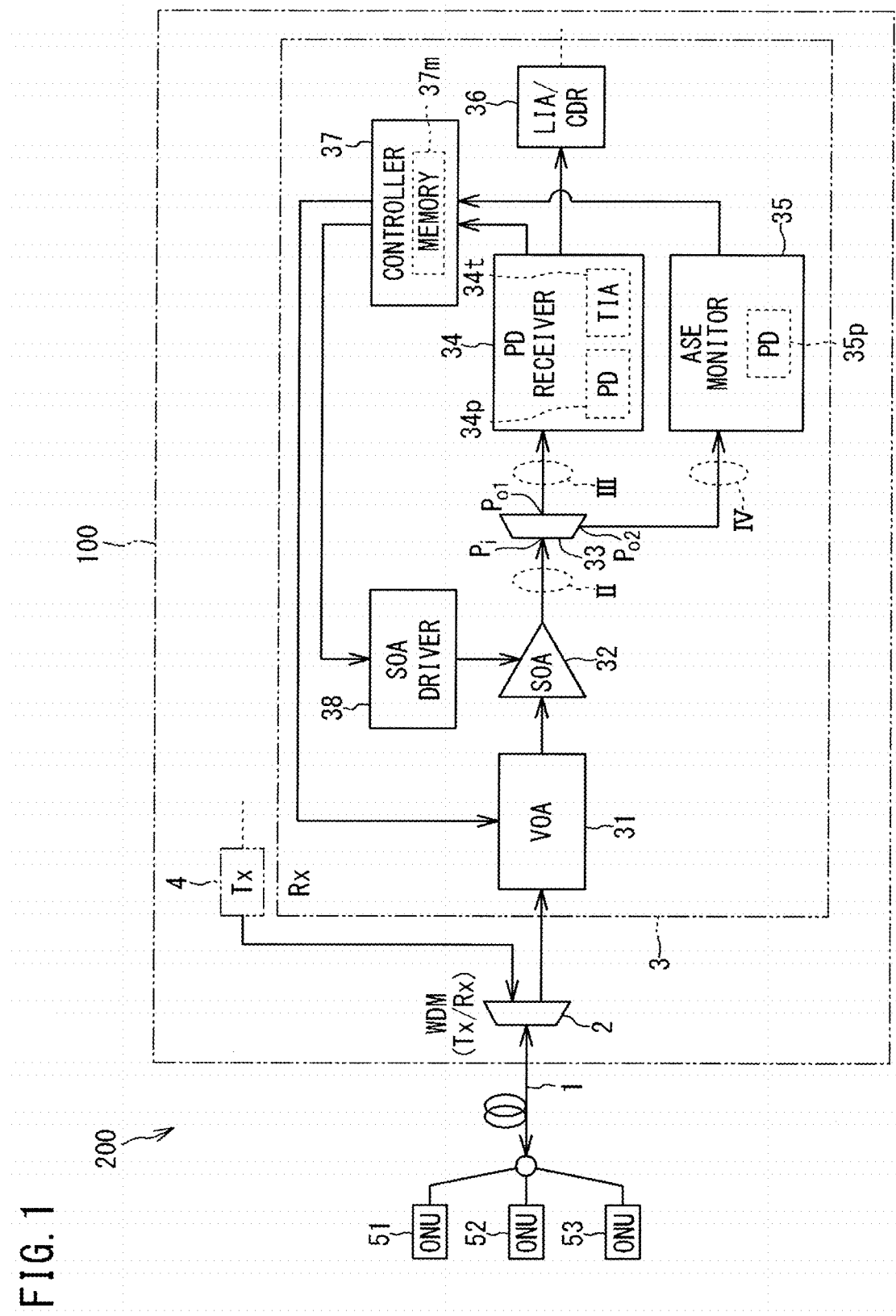
FIG. 1 is a connection diagram of an optical receiver module, and an optical line terminal and a PON system which include the optical receiver module.

Problems to be Solved by the Disclosure

In the conventional SOA control as described above, the optical signal is branched and monitored, and the SOA is controlled on the basis of the monitoring result, or alternatively, the optical signal is converted into an electric signal, and the SOA is controlled on the basis of the electric signal.

However, if optical branching is performed, loss is inevitably caused. Further, VOA control without performing optical branching is not disclosed.

In view of such conventional problems, an object of the present disclosure is to provide new optical receiving control including a variable optical attenuator, in a configuration different from optical branching.

Effects of the Present Disclosure

According to the present disclosure, an appropriate output can be obtained in the optical receiving control using the variable optical attenuator, without performing optical branching.

Summary of Embodiment

The summary of embodiment of the present disclosure includes at least the following.

(1) This is an optical receiver module configured to receive a first optical signal capable of including a continuous signal or a burst signal. The optical receiver module includes: a variable optical attenuator configured to adjust the first optical signal to output a second optical signal; a semiconductor optical amplifier configured to amplify the second optical signal to output a third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least a second power selected from between: a first power obtained by suppressing an outside portion of a wavelength band of the first optical signal in the third optical signal; and the second power obtained by extracting the outside portion of the wavelength band of the first optical signal in the third optical signal.

According to such an optical receiver module, the power of light inputted to the semiconductor optical amplifier can be estimated in consideration of the second power obtained by extracting the outside portion of the wavelength band (for example, ASE (Amplified Spontaneous Emission) noise which is to be removed originally), and the output of at least one of the variable optical attenuator and the semiconductor optical amplifier can be controlled so as to cause the semiconductor amplifier to operate in a region in which gain saturation thereof does not occur. Therefore, the power of the input to the semiconductor optical amplifier can be known without performing optical branching, and an appropriate output can be obtained in the optical receiving control using the variable optical attenuator.

(2) In the optical receiver module according to (1), for example, an optical filter is provided. The optical filter is configured to separate the third optical signal into: a fourth optical signal obtained by suppressing the outside portion of the wavelength band of the first optical signal in the third optical signal; and a fifth optical signal obtained by extracting the outside portion of the wavelength band of the first optical signal in the third optical signal. The controller has stored therein a correspondence relationship between power of the second optical signal and a photoelectric current obtained by detecting the fifth optical signal.

In this case, the power of light inputted to the semiconductor optical amplifier can be known on the basis of the photoelectric current based on the fifth optical signal (ASE noise, for example).

(3) In the optical receiver module according to (1), for example, an optical filter is provided. The optical filter is configured to separate the third optical signal into: a fourth optical signal obtained by suppressing the outside portion of the wavelength band of the first optical signal in the third optical signal; and a fifth optical signal obtained by extracting the outside portion of the wavelength band of the first optical signal in the third optical signal. The controller has stored therein a correspondence relationship between power of the second optical signal and both of a photoelectric current obtained by detecting the fourth optical signal and a photoelectric current obtained by detecting the fifth optical signal.

In this case, the power of light inputted to the semiconductor optical amplifier can be known, on the basis of the correspondence relationship between the power of the second optical signal and both of the photoelectric current obtained by detecting the fourth optical signal (true signal, so to speak) and the photoelectric current obtained by detecting the fifth optical signal (ASE noise, for example).

(4) In the optical receiver module according to (1), for example, with respect to reception of the first optical signal including the burst signal, the controller first performs rough control for suppressing the gain saturation on the basis of either one of the first power and the second power, and then performs fine control for suppressing the gain saturation on the basis of either one of the first power and the second power.

In this case, also with respect to the burst signal having varied power of the optical input, an appropriate output can be quickly obtained.

(5) From a viewpoint of a method, this is an optical receiving method performed by an optical receiver module. The optical receiver module is configured to receive an optical signal capable of including a continuous signal or a burst signal, to adjust power of the optical signal so as to have a predetermined value or lower, and to then amplify the power. The optical receiving method includes: estimating the power before the amplification thereof, on the basis of at least one of the amplified power and ASE noise included therein; and controlling, on the basis of an estimation result, at least one of a degree of the adjustment and a degree of the amplification so as to suppress gain saturation.

According to such an optical receiving method, the power of inputted light can be estimated in consideration of ASE noise which is to be removed originally, and at least one of the degree of adjustment and the degree of amplification can be controlled so as to suppress gain saturation. Therefore, the power of the input can be known without performing optical branching, and an appropriate output can be obtained in the optical receiving control using the variable optical attenuator.

(6) Further, this is an optical line terminal configured to communicate with a plurality of optical network units via an optical fiber. The optical line terminal includes as a part thereof an optical receiver module configured to receive a first optical signal capable of including a continuous signal or a burst signal. The optical receiver module includes: a variable optical attenuator configured to adjust the first optical signal to output a second optical signal; a semiconductor optical amplifier configured to amplify the second optical signal to output a third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least a second power selected from between: a first power obtained by suppressing an outside portion of a wavelength band of the first optical signal in the third optical signal; and the second power obtained by extracting the outside portion of the wavelength band of the first optical signal in the third optical signal.

According to such an optical receiver module of the optical line terminal, the power of light inputted to the semiconductor optical amplifier can be estimated in consideration of the second power obtained by extracting the outside portion of the wavelength band (for example, ASE noise which is to be removed originally), and the output of at least one of the variable optical attenuator and the semiconductor optical amplifier can be controlled so as to cause the semiconductor amplifier to operate in a region in which gain saturation thereof does not occur. Therefore, the power of the input to the semiconductor optical amplifier can be known without performing optical branching, and an appropriate output can be obtained in the optical receiving control using the variable optical attenuator.

(7) Further, this is a PON system including: a plurality of optical network units; an optical transmission path formed by an optical fiber; and an optical line terminal configured to communicate with the plurality of optical network units via the optical transmission path. The optical line terminal includes, as a part thereof, an optical receiver module configured to receive a first optical signal from the optical network units. The optical receiver module includes: a variable optical attenuator configured to adjust the first optical signal to output a second optical signal; a semiconductor optical amplifier configured to amplify the second optical signal to output a third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least a second power selected from between: a first power obtained by suppressing an outside portion of a wavelength band of the first optical signal in the third optical signal; and the second power obtained by extracting the outside portion of the wavelength band of the first optical signal in the third optical signal.

According to such an optical receiver module of the PON system, the power of light inputted to the semiconductor optical amplifier can be estimated in consideration of the second power obtained by extracting the outside portion of the wavelength band (for example, ASE noise which is to be removed originally), and the output of at least one of the variable optical attenuator and the semiconductor optical amplifier can be controlled so as to cause the semiconductor amplifier to operate in a region in which gain saturation thereof does not occur. Therefore, the power of the input to the semiconductor optical amplifier can be known without performing optical branching, and an appropriate output can be obtained in the optical receiving control using the variable optical attenuator.

(8) Further, this is an optical filter including: an input port configured to receive an output of an optical signal from a variable optical attenuator via a semiconductor optical amplifier; a first output port configured to output light obtained by suppressing an outside portion of a wavelength band of the optical signal in an optical input received at the input port; and a second output port configured to output light obtained by extracting the outside portion of the wavelength band of the optical signal in the optical input received at the input port.

By use of such an optical filter in the optical receiver module, the power of light inputted to the semiconductor optical amplifier can be estimated in consideration of light obtained by extracting the outside portion of the wavelength band (for example, ASE noise which is to be removed originally), and the output of at least one of the variable optical attenuator and the semiconductor optical amplifier can be controlled so as to cause the semiconductor amplifier to operate in a region in which gain saturation thereof does not occur. Therefore, the power of the input to the semiconductor optical amplifier can be known without performing optical branching, and an appropriate output can be obtained in the optical receiving control using the variable optical attenuator.

[Details of the Embodiment]

Hereinafter, an optical receiver module, and an optical line terminal and a PON system which include the optical receiver module according to one embodiment of the present disclosure will be described with reference to the drawings.

<<Circuit Configuration>>

FIG. 1 is a connection diagram of an optical receiver module, and an optical line terminal and a PON system which include the optical receiver module.

In FIG. 1, a PON (Passive Optical Network) system 200 is formed by connecting one optical line terminal (OLT) 100 and a large number of (three as an example) optical network units (ONU) 51, 52, 53 by means of an optical fiber 1.

The optical line terminal 100 includes an optical receiver module 3, an optical transmission module 4, and a multiplexer/demultiplexer 2. Uplink signals sent from the ONUs 51 to 53 are received by the optical receiver module 3 via the multiplexer/demultiplexer 2. Conversely, downlink signals to be sent from the optical transmission module 4 to the ONUs 51 to 53 are delivered to the ONUs 51 to 53 via the multiplexer/demultiplexer 2. The optical receiver module 3 and the optical transmission module 4 are each connected to a higher-position device (not shown) in the optical line terminal 100.

Since the present embodiment relates to optical reception, the optical receiver module 3 is mainly described in the following. The optical receiver module 3 includes: a variable optical attenuator (VOA, hereinafter referred to as VOA) 31; a semiconductor optical amplifier (SOA, hereinafter referred to as SOA) 32; an optical filter 33 of a wavelength division multiplexing (WDM) type; a PD receiver 34; an ASE monitor 35; an LIA/CDR (Limiting-Amplifier/Clock and Data Recovery) circuit 36; a controller 37; and an SOA driver 38 which provides a drive current to the SOA 32. Processes after the LIA/CDR circuit 36 are not shown.

The VOA 31 adjusts an attenuation amount such that the power of the optical input has a predetermined value or lower. The SOA 32 receives the output of the VOA 31 and amplifies the power. The optical filter 33 separates the output of the SOA 32 into: a signal within a band including the received signal; and ASE (Amplified Spontaneous Emission) noise outside the wavelength band. Specifically, the optical filter 33 includes: an input port $P_i$ which receives the output of the SOA 32; a first output port $P_{o1}$ which outputs a signal within a band including the received signal in the optical input received at the input port $P_i$; and a second output port $P_{o2}$ which reflects and outputs ASE noise in the optical input received at the input port $P_i$.

The PD receiver 34 includes a photodiode 34p and a transimpedance amplifier 34t. The ASE monitor 35 includes a photodiode 35p. The PD receiver 34 receives the signal from the first output port $P_{o1}$ of the optical filter 33, performs photoelectric conversion thereon, and outputs a photoelectric current. The ASE monitor 35 receives the ASE noise from the second output port $P_{o2}$ of the optical filter 33, performs photoelectric conversion thereon, and outputs a photoelectric current. The LIA/CDR circuit 36 receives the output of the PD receiver 34 and performs clock and data recovery. The output of the PD receiver 34 and the output of the ASE monitor 35 are each provided to the controller 37.

The controller 37 includes a computer, for example, and the computer executes software (computer program), thereby realizing necessary control functions. The software is stored in a memory 37m provided to the controller 37, for example. However, it is also possible to configure the controller 37 as circuitry composed of only hardware that does not include a computer.

The SOA driver 38, together with the controller 37, can also be considered as a "controller" in a broad sense.

In the memory 37m of the controller 37, the relationship indicated below is stored as a database, for example. Which of (i), (ii), or (iii) is stored depends on the relationship with the control.

(i) Correspondence relationship between: the power of light inputted to the SOA 32; and a photoelectric current, which is obtained as a result of ASE noise having been separated at the optical filter 33 and subjected to photoelectric conversion at the ASE monitor 35.

(ii) Correspondence relationship between: the power of light inputted to the SOA 32; and a photoelectric current based on a signal within a band including the received signal, the photoelectric current obtained as a result of a portion, of the output of the SOA 32, having passed through the optical filter 33 and having been subjected to photoelectric conversion at the PD receiver 34.

(iii) Correspondence relationship between: the power of light inputted to the SOA 32; and both of a photoelectric current outputted by the PD receiver 34 and a photoelectric current outputted by the ASE monitor 35.

When uplink signals are sent from the ONU in a time division manner, the VOA 31 receives the uplink signals, and if the power of the optical input exceeds a predetermined value, the VOA 31 adjusts an attenuation amount such that the power of the optical input has a predetermined value or lower. Subsequently, the SOA 32 receives the output of the VOA 31, and amplifies the power while suppressing gain saturation.

The photoelectric current outputted by the PD receiver 34 and the photoelectric current outputted by the ASE monitor 35 are inputted to the controller 37. The PD receiver 34 provides an output to both of the LIA/CDR circuit 36 and the controller 37, but this is not electric branching. The PD receiver 34 electrically copies the output that is to be sent to the LIA/CDR circuit 36 and sends the copied output also to the controller 37.

The controller 37 can estimate the power of light inputted to the SOA 32 on the basis of the inputted photoelectric current. At this time, the photoelectric current the estimation is to be based on, i.e., the monitoring target, is: (i) the photoelectric current outputted by the ASE monitor 35, i.e., the ASE noise; (ii) the photoelectric current outputted by the PD receiver 34, i.e., original received signal; or (iii) the total of the photoelectric current outputted by the ASE monitor 35 and the photoelectric current outputted by the PD receiver 34, i.e., the output of the SOA 32. Among these, the monitoring target that is particularly characteristic in the present embodiment is (i), or (iii) which includes (i). These monitoring targets (i), (ii), and (iii) respectively correspond to the databases (i), (ii), and (iii) described above.

For example, in the case of (i), on the basis of the photoelectric current which is outputted by the ASE monitor 35 and which corresponds to the ASE noise, the controller 37 estimates the power of light inputted to the SOA 32, and in accordance with the estimation result, the controller 37 controls at least one of: the VOA 31; and the SOA 32 via the SOA driver 38. For example, in the case of a power at which the bit error rate after signal reception is at a specified quality (1e-12) or lower and which exceeds a predetermined threshold, the following control can be performed.

(a) Control the VOA 31 to increase the attenuation amount, thereby suppressing gain saturation of the SOA 32.

(b) Control the SOA driver 38 to decrease the drive current for the SOA 32, thereby suppressing gain saturation of the SOA 32.

(c) Perform both of (a) and (b) above, thereby suppressing gain saturation of the SOA 32. For example, the drive current for the SOA 32 is variably controlled such that gain saturation does not occur, and when the lower limit value of the drive current is reached, the attenuation amount of the VOA 31 is controlled while the photoelectric current is maintained.

Accordingly, gain saturation at the SOA 32 can be suppressed.

Since the ASE noise, which is to be excluded originally, is used as an index for the power of inputted light, gain saturation at the SOA 32 can be suppressed without branching the light of the original received signal.

<<Optical Signal Waveform of Units>>

Figure 2:
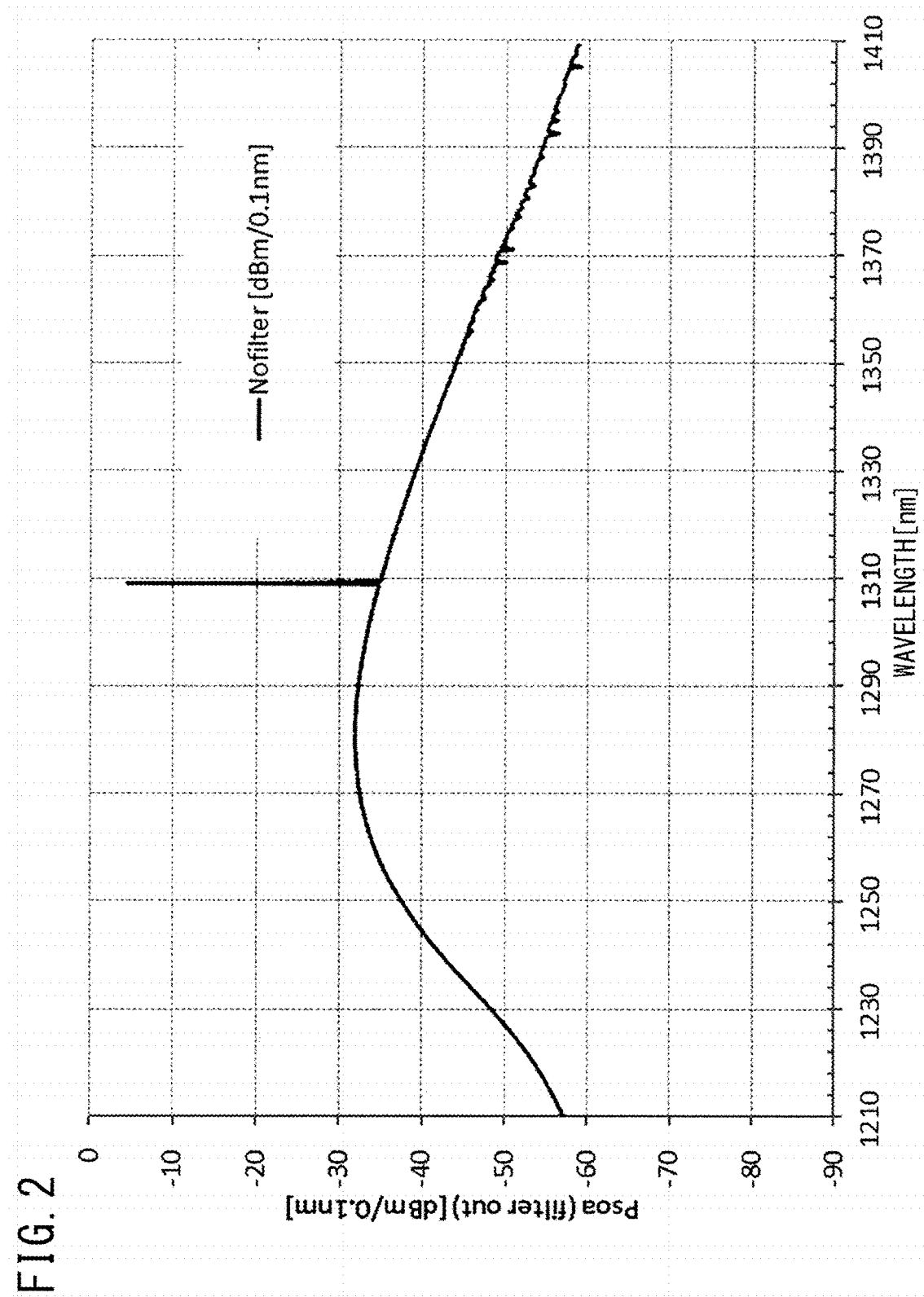
FIG. 2 is a graph showing the spectrum of the output of an SOA in FIG. 1, i.e., the light at a part "II".

FIG. 2 is a graph showing the spectrum of the output of the SOA 32 in FIG. 1, i.e., the light at a part "II". The horizontal axis represents wavelength and the vertical axis represents power (strength) of light. The portion protruding sharply near the wavelength 1310 [nm] is the original received signal. The other portion is ASE noise.

Figure 3:
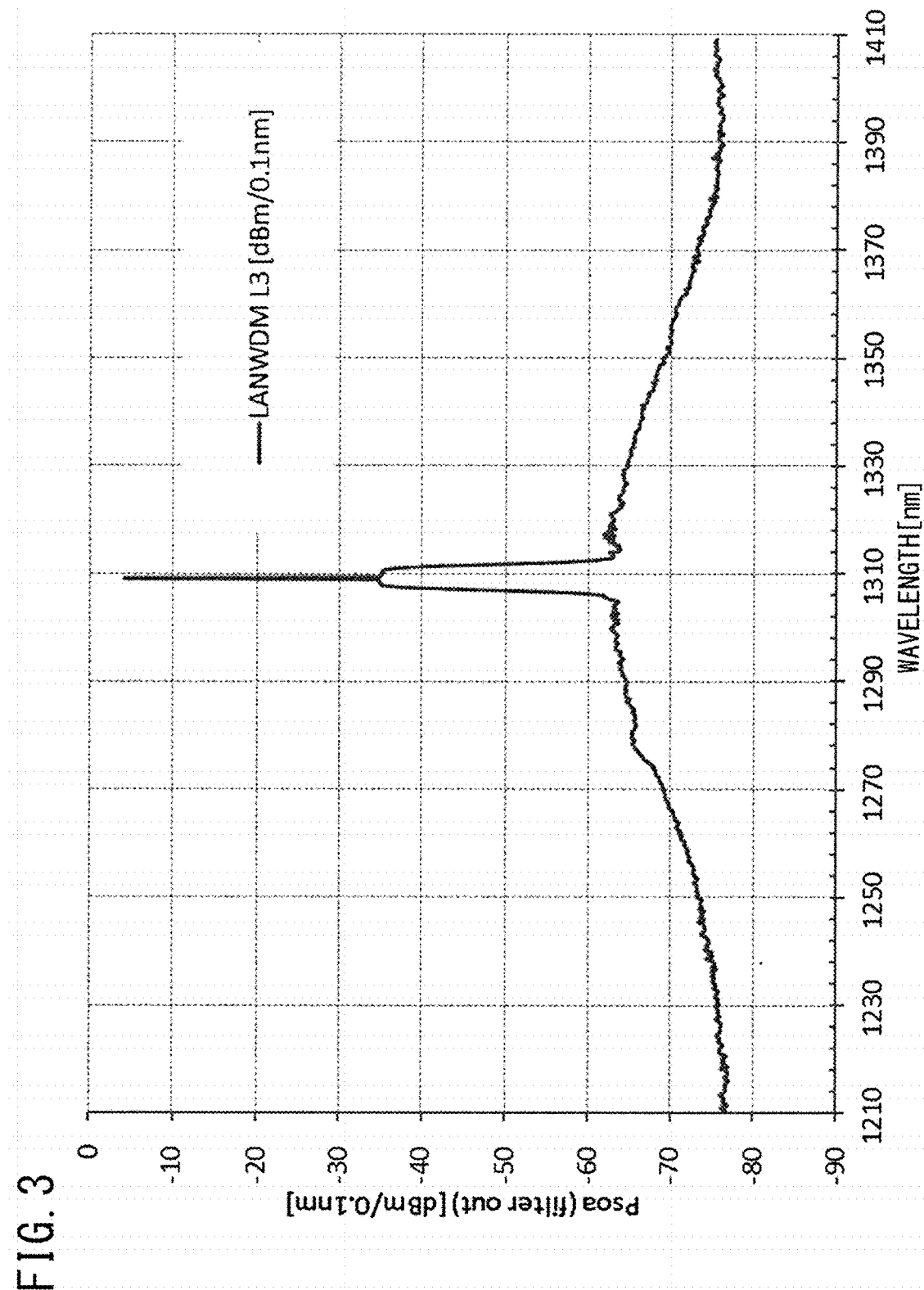
FIG. 3 is a graph showing the spectrum of the output of an optical filter in FIG. 1, i.e., the light at a part "III".

FIG. 3 is a graph showing the spectrum of the output of the optical filter 33 in FIG. 1, i.e., the light at a part "III". The horizontal axis represents wavelength and the vertical axis represents power (strength) of light. The portion protruding sharply near the wavelength 1310 [nm] is the original received signal. The portion below the sharp protruding portion and having a slight width with respect to the sharp protruding portion is the portion, of ASE noise, that has been eventually allowed to pass through the optical filter 33 due to the pass characteristic of the optical filter 33. The other portion is the ASE noise that has been significantly attenuated. As is apparent from comparison with FIG. 2, the ASE noise level is significantly lowered due to the optical filter 33.

Figure 4:
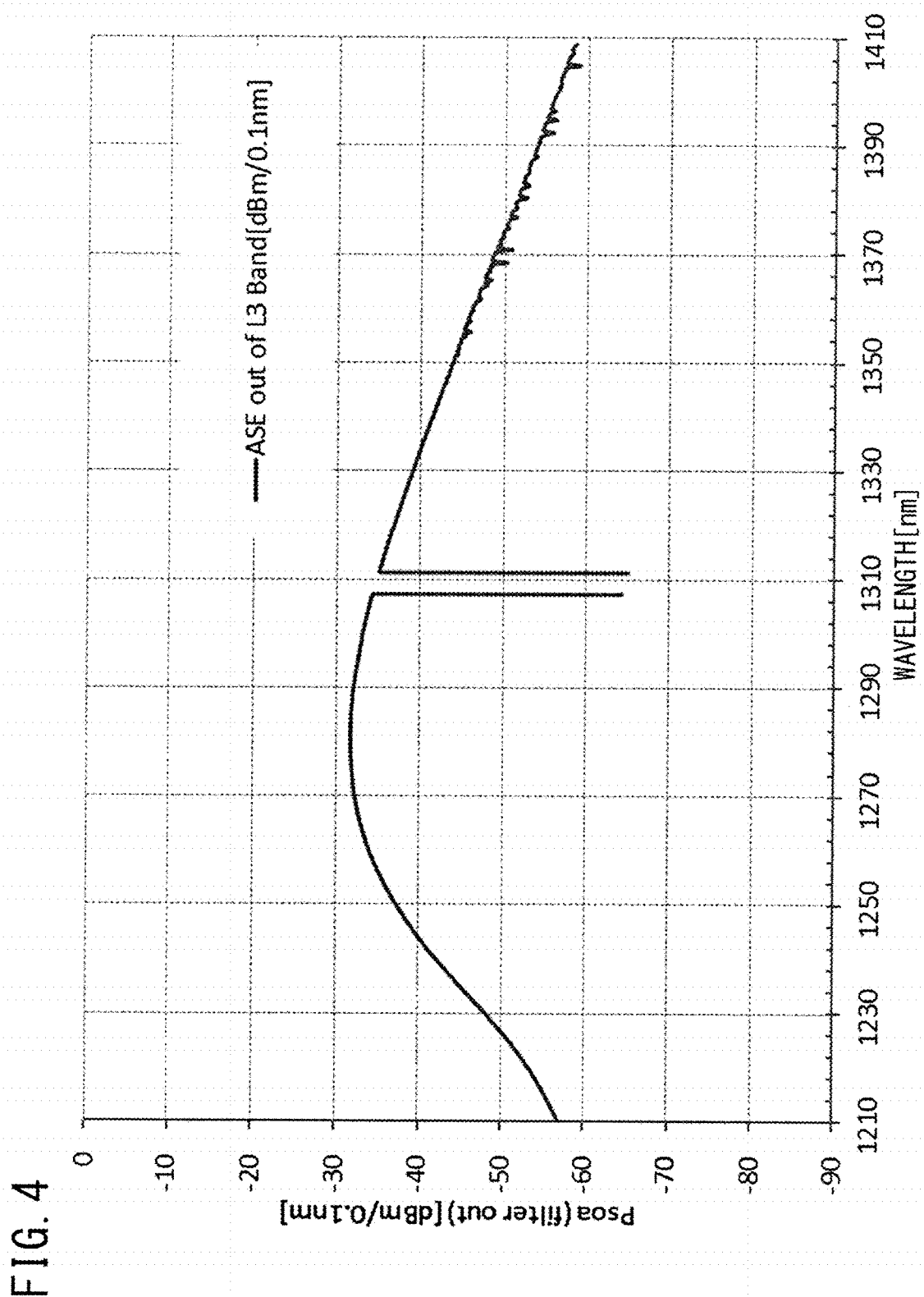
FIG. 4 is a graph showing the spectrum of light, outside the wavelength band of a received signal, extracted by the optical filter in FIG. 1, i.e., the light of ASE noise observed at a part "IV".

FIG. 4 is a graph showing the spectrum of light, outside the wavelength band of the received signal, extracted by the optical filter 33 in FIG. 1, i.e., the light of ASE noise observed at the part "IV". The horizontal axis represents wavelength and the vertical axis represents power (strength) of light (noise). The portion near the wavelength 1310 [nm] is lost and the ASE noise is distributed widely in the other portion.

<<Input Power Dependence of SOA Output Spectrum>>

Figure 5:
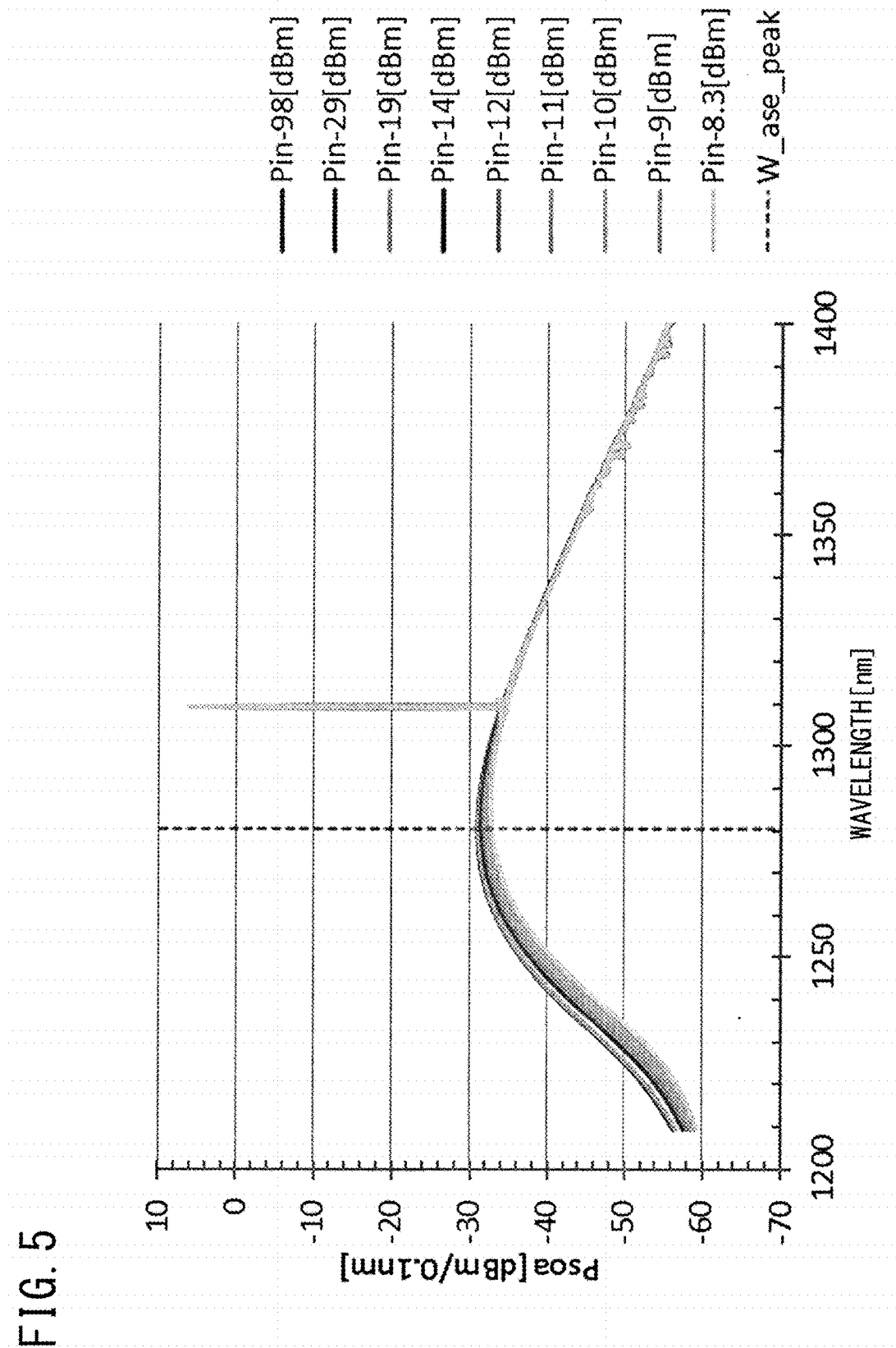
FIG. 5 is a graph showing the spectrum of the output of the SOA, using the input power of light into the SOA as a parameter.

FIG. 5 is a graph showing the spectrum of the output of the SOA 32, using the input power of light into the SOA 32 as a parameter.

"Pin-digit" at the right side of the graph corresponds to the strength of the input power in nine levels. In the graph, nine kinds of ASE noise curves are shown close to one another. The portion near the wavelength 1310 [nm] is the original received signal. The dotted line near the wavelength 1280 [nm] indicates the wavelength at which the ASE noise peaks.

Figure 6:
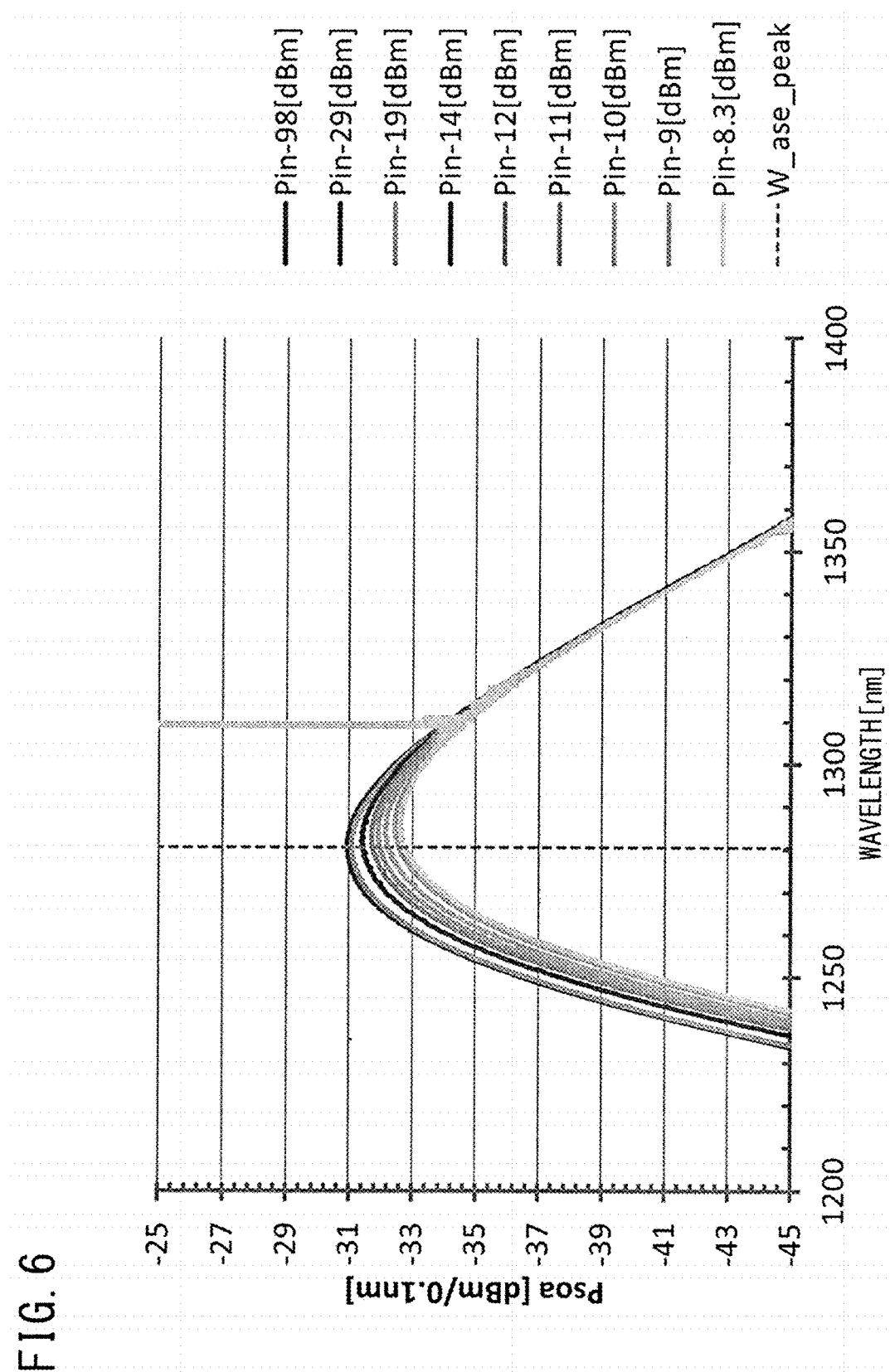
FIG. 6 is a graph obtained by making the numerical value interval small along the vertical axis (i.e., expanded in the vertical direction) of the graph in FIG. 5.

FIG. 6 is a graph obtained by making the numerical value interval small along the vertical axis (i.e., expanded in the vertical direction) of the graph shown in FIG. 5. With reference to the peak position (dotted line) of the ASE noise, it is seen that the ASE noise is varied in nine levels in accordance with the input power.

Therefore, a finding is obtained that, for example, if the ASE noise near the wavelength 1280 [nm] is known, the power of the optical input can be easily estimated.

Figure 7:
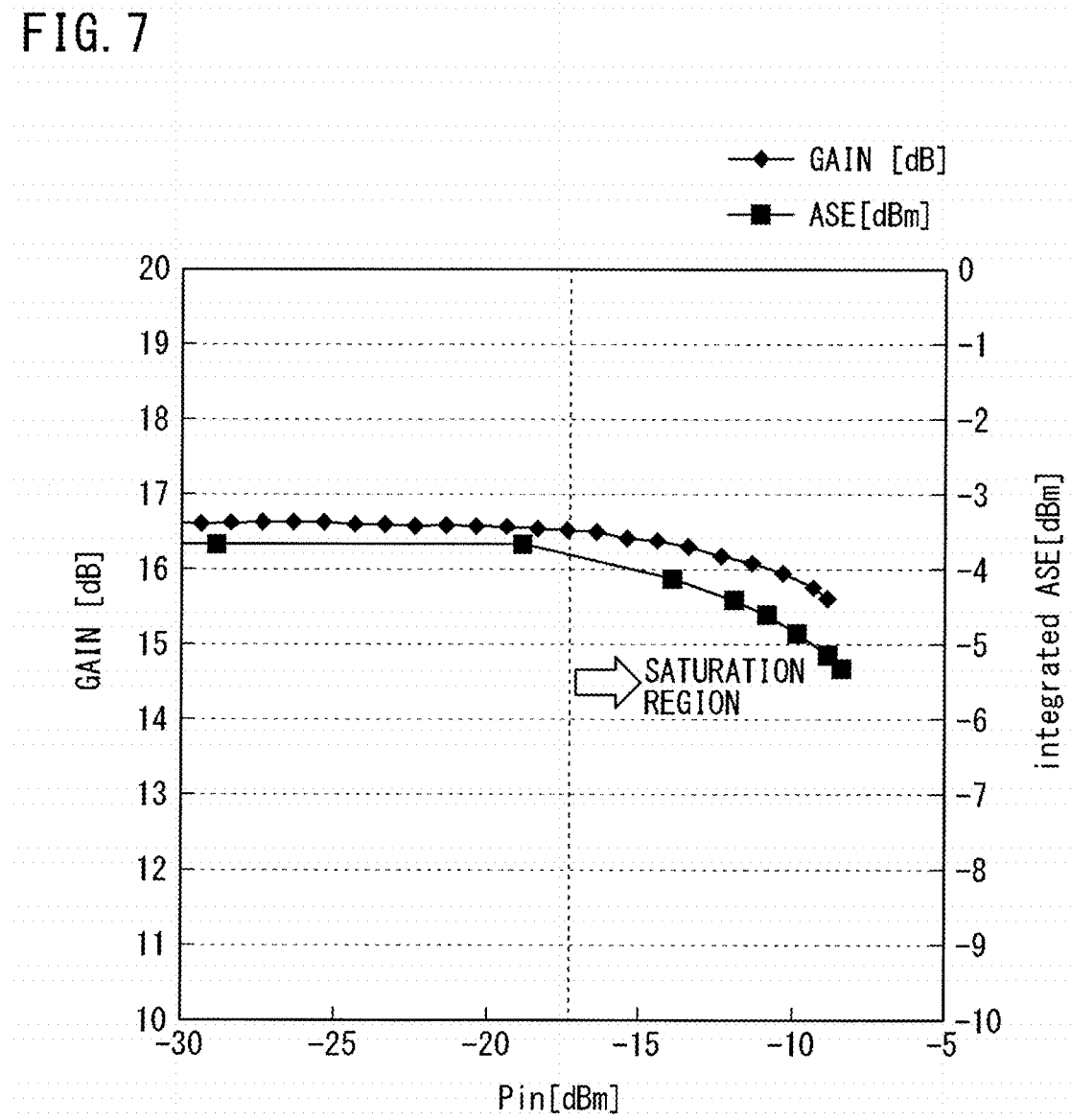
FIG. 7 is a graph showing the characteristic of gain with respect to the input to the SOA.

FIG. 7 is a graph showing the characteristic of gain with respect to the input to the SOA 32. The horizontal axis represents input Pin [dBm], the vertical axis at the left represents gain [dB] of the SOA 32, and the vertical axis at the right represents power of ASE noise (integrated value) [dBm]. Of the two curves, the upper curve represents the gain of the SOA 32, and the lower curve represents the integrated value of the ASE noise. Both are closely related to each other. The left part with respect to the vertically-extending dotted line at the center represents a non-saturation region, and the right part with respect thereto represents a saturation region. The gain of the SOA 32 and the integrated value of the ASE noise are stable in the non-saturation region, but are decreased in the saturation region in association with increase of the input. Therefore, the input is adjusted such that the SOA 32 is used in the non-saturation region. Thus, the attenuation amount of the VOA 31 is feedback-controlled such that the integrated value of the ASE noise is maintained to be the value on the vertical dotted line or greater.

<<Monitoring Target and Control Target>>

As described above, the monitoring target is (i), (ii), or (iii). A target that is surely controlled is the VOA 31. As for the control of the VOA 31, the received signal may be either a continuous signal or a burst signal.

In addition, the SOA 32 may be controlled singly, or may be controlled together with the VOA 31. However, if the drive condition of the SOA 32 is continuously changed, the level of the ASE noise varies. Thus, even when the signal that is received is a continuous signal, the timing at which the control is performed needs to be specified. In the case of a burst signal, it is necessary that: the level of the ASE noise is monitored; and the period in which the drive condition of the SOA 32 is changed is set to the entire section or a partial section after the start of the burst signal and before the payload.

<<The Case of Burst Signal>>

Next, the control in the case of the burst signal is specifically described.

To summarize the control, a section in which rough control is performed on a VOA attenuation value and an SOA drive condition (mainly, current), and a section in which fine control is performed on the VOA attenuation value and the SOA drive condition are prepared in a synchronization pattern section at the beginning of a burst. For example, if a first section, a second section, and a third section are defined from the beginning of the burst in this order, the first section serves as a rough control section for the VOA and the SOA. The second section serves as a fine control section for the VOA and the SOA, and also serves as a predetermined waiting time period. The third section serves as a CDR lock section, a PCS (Physical Coding Sublayer) synchronization section, and a transmission data effective (payload) section.

Figure 8:
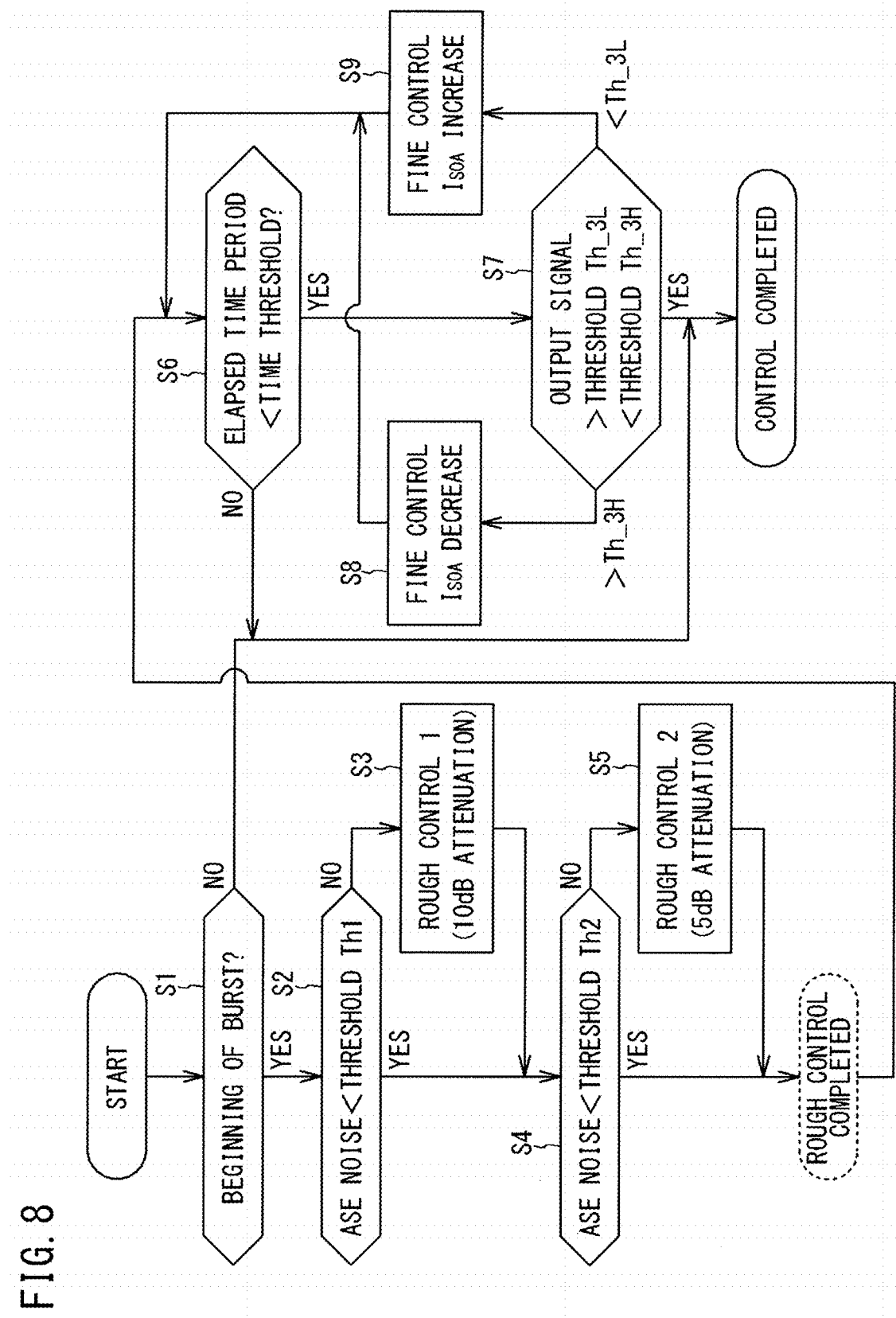
FIG. 8 is a flow chart showing one example of burst control.

FIG. 8 is a flow chart showing one example of burst control. The execution subject of the process of this flow chart is the controller 37.

First, in step S1, the controller 37 determines whether or not the beginning of a burst signal has arrived. When the determination is "No", the controller 37 completes the control without doing anything. When the determination is "Yes", the controller 37 determines whether or not ASE noise from the ASE monitor 35 is less than a threshold Th1 (for example, −5 dBm) (step S2). When the determination is "No", i.e., the ASE noise is not less than the threshold Th1, the controller 37 performs "rough control 1" (step S3). Specifically, for example, the controller 37 applies 10 dB attenuation. When the determination in step S2 is "Yes", the controller 37 advances to step S4.

In step S4, the controller 37 determines whether or not the ASE noise is less than a threshold Th2 (for example, −4 dBm). When the determination is "No", i.e., the ASE noise is not less than the threshold Th2, the controller 37 performs "rough control 2" (step S5). Specifically, for example, the controller 37 applies 5 dB attenuation. When the 5 dB attenuation has been applied or when the determination in step S4 is "Yes", the "rough control is completed" here. The time period required for the rough control is about several tens of ns for each of "rough control 1" and "rough control 2".

Next, the controller 37 determines whether or not the elapsed time period from the start is within a time limit of a time threshold (for example, several hundreds of ns) (step S6). When the elapsed time period is within the time limit, the controller 37 performs fine control. First, in step S7, the controller 37 determines whether or not the output signal is within a range from a threshold Th_3L to a threshold Th_3H. For example, when the gain without the fine control is about 16.5 dB, the threshold Th_3L is about −9 dBm, and the threshold Th_3H is about −3 dBm.

When the output signal is greater than the threshold Th_3H, the controller 37 decreases the drive current for the SOA 32 by $\Delta I_{SOA}$ (step S8). When the output signal is less than the threshold Th_3L, the controller 37 increases the drive current for the SOA 32 by $\Delta I_{SOA}$ (step S9). Such fine control is repeated several times, and when the time limit is reached in step S6, the control is completed.

In the flow chart described above, the ASE noise is monitored in the rough control, and the output signal of the SOA 32 is monitored in the fine control. Including these, the following four kinds of combinations of the rough control and the fine control are conceivable. The flow chart described above is (C2) below.

(C1) Rough control: ASE noise of SOA output; fine control: ASE noise of SOA output (C2) Rough control: ASE noise of SOA output; fine control: SOA output signal (C3) Rough control: SOA output signal; fine control: ASE noise of SOA output (C4) Rough control: SOA output signal; fine control: SOA output signal Of the four kinds above, the combination that has significance in using ASE noise is considered to be (C1) and (C2). As for (C3), since the rough control is performed at high speed on the basis of the SOA output signal, (C3) has little significance in using ASE noise in the fine control.

It should be noted that burst signals coming from the plurality of ONUs 51 to 53 have different strengths of light. However, if the VOA 31 is adjusted on the basis of ASE noise and then the SOA 32 is controlled, rough control can be performed quickly even in a case where the strength ratio is large (for example, 20 dB or greater) between burst signals of the optical input.

<<The Case of Continuous Signal>>

In the case of a continuous signal, in FIG. 1, after the input power to the SOA 32 has reached an upper limit level at which the bit error rate of the received signal is at a specified quality (1e-12) or lower, the controller 37 controls the attenuation amount of the VOA 31 so as to maintain the input power to the SOA 32 that would not cause gain saturation of the SOA 32.

Meanwhile, in a case where the monitoring target is (ii), after the photoelectric current of the PD receiver 34 has reached an upper limit level at which the bit error rate of the received signal is at a specified quality (1e-12) or lower, the controller 37 controls the drive current for the SOA 32 so as to maintain the photoelectric current that would not cause gain saturation of the SOA 32, and when the drive current has reached a lower limit threshold, the controller 37 controls the attenuation amount of the VOA 31, together with the SOA 32, so as to maintain the photoelectric current.

<<Definition of Optical Signal>>

Figure 9:
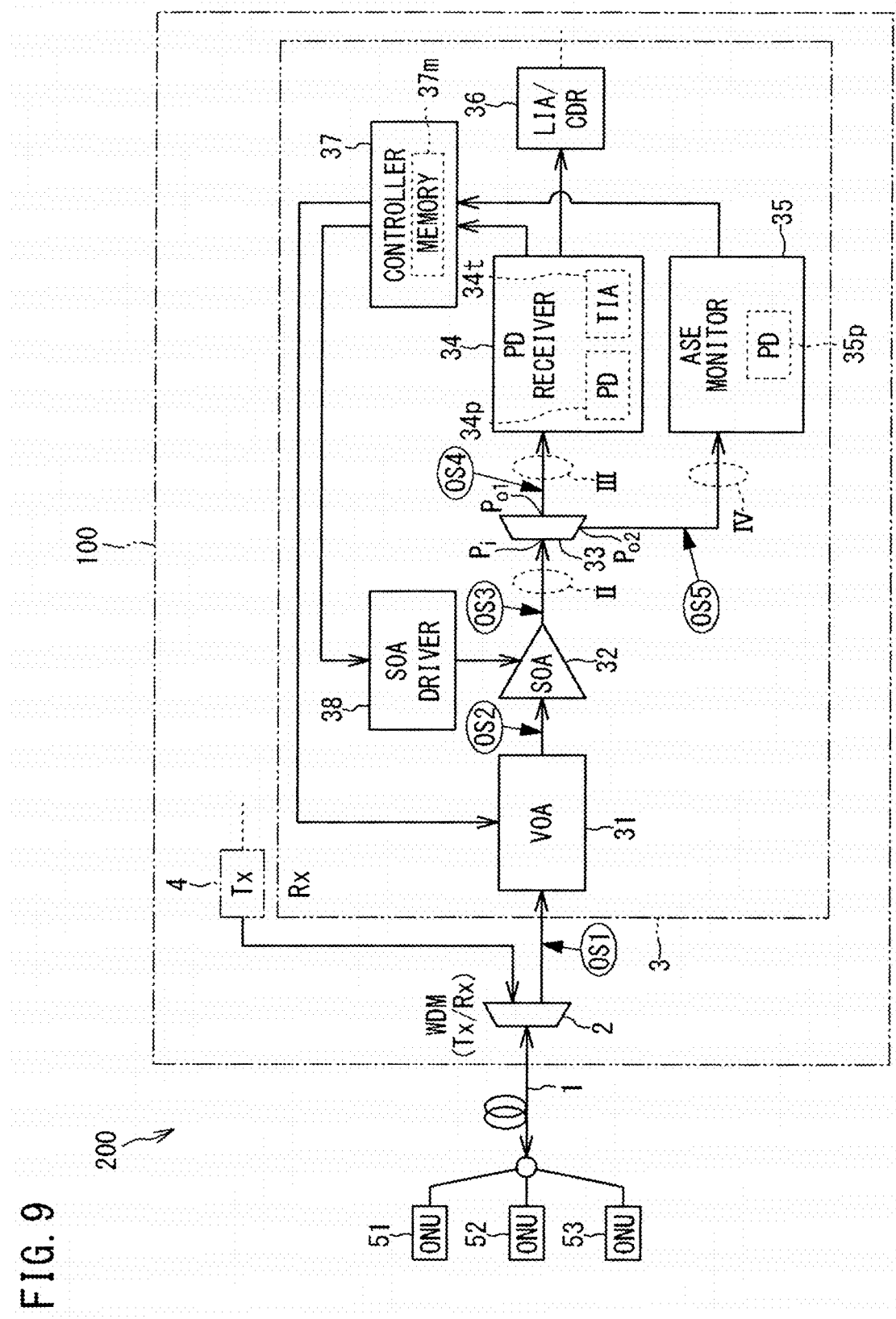
FIG. 9 is a diagram obtained by attaching reference signs of optical signals to the diagram shown in FIG. 1.

FIG. 9 is a diagram obtained by attaching reference signs (OS1 to OS5) of optical signals to the diagram shown in FIG. 1.

What is inputted from the multiplexer/demultiplexer 2 to the VOA 31 is defined as a first optical signal OS1.

What is outputted from the VOA 31 is defined as a second optical signal OS2.

What is outputted from the SOA 32 is defined as a third optical signal OS3.

The optical filter 33 separates the third optical signal OS3 into: a fourth optical signal OS4 obtained by suppressing the outside portion of the wavelength band of the first optical signal OS1 in the third optical signal OS3; and a fifth optical signal OS5 obtained by extracting the outside portion of the wavelength band of the first optical signal OS1 in the third optical signal OS3.

SUMMARY

By use of the definitions of the optical signals descried above, the optical receiver module 3 of the present embodiment can be expressed as follows, for example. That is, the optical receiver module 3 is configured to receive the first optical signal OS1 capable of including a continuous signal or a burst signal, and includes: the VOA 31 configured to adjust the first optical signal OS1 to output the second optical signal OS2; the SOA 32 configured to amplify the second optical signal OS2 to output the third optical signal OS3; and the controller 37 configured to control an output of at least one of the VOA 31 and the SOA 32 so as to cause the SOA 32 to operate in a region in which gain saturation of the SOA 32 does not occur, on the basis of at least a second power selected from between: a first power (input to the PD receiver 34) obtained by suppressing the outside portion of the wavelength band of the first optical signal OS1 in the third optical signal OS3; and the second power (input to the ASE monitor 35) obtained by extracting the outside portion of the wavelength band of the first optical signal OS1 in the third optical signal OS3.

In the optical receiver module 3, the power of light inputted to the SOA 32 can be estimated in consideration of the second power obtained by extracting the outside portion of the wavelength band (for example, ASE noise which is to be removed originally), and the SOA 32 can be caused to operate in a region in which gain saturation of the SOA 32 does not occur. Therefore, the power of the input to the SOA 32 can be known without performing optical branching, and an appropriate output can be obtained in the optical receiving control using the VOA 31.

The same applies to the optical line terminal 100 and the PON system 200 which include the optical receiver module 3.

The optical filter 33 separates the third optical signal OS3 into: the fourth optical signal OS4 obtained by suppressing the outside portion of the wavelength band of the first optical signal OS1 in the third optical signal OS3; and the fifth optical signal OS5 obtained by extracting the outside portion of the wavelength band of the first optical signal OS1 in the third optical signal OS3. The controller 37 has stored therein the correspondence relationship between the photoelectric current obtained by detecting the fifth optical signal OS5 and the power of the second optical signal OS2 ((i) described above). In this case, the power of light inputted to the SOA 32 can be known on the basis of the photoelectric current based on the fifth optical signal OS5 (ASE noise, for example).

The controller 37 has stored therein the correspondence relationship between the power of the second optical signal OS2 ((iii) described above) and both of the photoelectric current obtained by detecting the fourth optical signal OS4 and the photoelectric current obtained by detecting the fifth optical signal OS5.

In this case, the power of light inputted to the SOA 32 can be known on the basis of the correspondence relationship between the power of the second optical signal OS2 and both of the photoelectric current obtained by detecting the fourth optical signal OS4 (true signal, so to speak) and the photoelectric current obtained by detecting the fifth optical signal OS5 (ASE noise, for example).

If expressed as a method, the present disclosure is an optical receiving method performed by the optical receiver module 3 configured to receive an optical input capable of including a continuous signal or a burst signal, adjust the power of the optical input so as to have a predetermined value or lower, and then amplify the power, the optical receiving method including: estimating the power before the amplification thereof, on the basis of at least one of the amplified power and ASE noise included therein; and controlling, on the basis of an estimation result, at least one of a degree of adjustment and a degree of amplification so as to suppress gain saturation.

According to such an optical receiving method, the power of inputted light can be estimated in consideration of ASE noise which is to be removed originally, and at least one of the degree of adjustment and the degree of amplification can be controlled so as to suppress gain saturation. Therefore, the power of the input can be can be known without performing optical branching, and an appropriate output can be obtained in the optical receiving control using the variable optical attenuator.

<<Supplementary Note>>

It should be noted that the embodiment disclosed herein is merely illustrative and not restrictive in all aspects. The scope of the present disclosure is defined by the scope of the claims, and is intended to include meaning equivalent to the scope of the claims and all modifications within the scope.

REFERENCE SIGNS LIST 1 optical fiber
2 multiplexer/demultiplexer
3 optical receiver module
4 optical transmission module
31 VOA (variable optical attenuator)
32 SOA (semiconductor optical amplifier)
33 optical filter
34 PD receiver
34$p$ photodiode
34$t$ transimpedance amplifier
35 ASE monitor
35$p$ photodiode
36 LIA/CDR circuit
37 controller
37$m$ memory
38 SOA driver
51, 52, 53 optical network unit
100 optical line terminal
200 PON system
OS1 first optical signal
OS2 second optical signal
OS3 third optical signal
OS4 fourth optical signal
OS5 fifth optical signal
$P_i$ input port
$P_{o1}$ first output port
$P_{o2}$ second output port

The invention claimed is:

1. An optical receiver module configured to receive a first optical signal capable of including a continuous signal or a burst signal, the optical receiver module comprising:
   a variable optical attenuator configured to adjust the first optical signal to output a second optical signal;
   a semiconductor optical amplifier configured to amplify the second optical signal to output a third optical signal;
   an optical filter configured to supply a first power obtained by suppressing an outside portion of a wavelength band of the first optical signal in the third optical signal and a second power obtained by extracting the outside portion of the wavelength band of the first optical signal in the third optical signal; and
   a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least the second power,
   wherein the optical filter is configured to separate the third optical signal into: a fourth optical signal obtained by suppressing the outside portion of the wavelength band of the first optical signal in the third optical signal; and a fifth optical signal obtained by extracting the outside portion of the wavelength band of the first optical signal in the third optical signal, and
   wherein the controller has stored therein a correspondence relationship between power of the second optical signal and a photoelectric current obtained by detecting the fifth optical signal.

2. The optical receiver module according to claim 1, wherein the controller has stored therein a correspondence relationship between power of the second optical signal and both of a photoelectric current obtained by detecting the fourth optical signal and the photoelectric current obtained by detecting the fifth optical signal.

3. The optical receiver module according to claim 1, wherein
   with respect to reception of the first optical signal including the burst signal,
   the controller first performs rough control for suppressing the gain saturation on the basis of either one of the first power and the second power, and then performs fine control for suppressing the gain saturation on the basis of either one of the first power and the second power.

4. An optical receiving method performed by an optical receiver module, the optical receiving method comprising:
   receiving a first optical signal capable of including a continuous signal or a burst signal;
   adjusting the first optical signal to output a second optical signal;
   amplifying the second optical signal to output a third optical signal;

executing an optical filtering to separate the third optical signal into a fourth optical signal obtained by suppressing the outside portion of the wavelength band of the first optical signal and a fifth optical signal obtained by extracting the outside portion of the wavelength band of the first optical signal;

estimating a power of the second optical signal, on the basis of a correspondence relationship between the power and a photoelectric current obtained by detecting the fifth optical signal; and controlling, on the basis of an estimation result, at least one of an adjusting degree of and an amplifying a degree so as to suppress gain saturation.

5. An optical line terminal configured to communicate with a plurality of optical network units via an optical fiber, the optical line terminal comprising, as a part thereof, an optical receiver module configured to receive a first optical signal capable of including a continuous signal or a burst signal, the optical receiver module including:

a variable optical attenuator configured to adjust the first optical signal to output a second optical signal;

a semiconductor optical amplifier configured to amplify the second optical signal to output a third optical signal;

an optical filter configured to supply a first power obtained by suppressing an outside portion of a wavelength band of the first optical signal in the third optical signal and a second power obtained by extracting the outside portion of the wavelength band of the first optical signal in the third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least the second power, wherein the optical filter is configured to separate the third optical signal into: a fourth optical signal obtained by suppressing the outside portion of the wavelength band of the first optical signal in the third optical signal; and a fifth optical signal obtained by extracting the outside portion of the wavelength band of the first optical signal in the third optical signal, and wherein the controller has stored therein a correspondence relationship between power of the second optical signal and a photoelectric current obtained by detecting the fifth optical signal.

6. A PON system comprising:

a plurality of optical network units;

an optical transmission path formed by an optical fiber; and an optical line terminal configured to communicate with the plurality of optical network units via the optical transmission path, the optical line terminal including, as a part thereof, an optical receiver module configured to receive a first optical signal from the optical network units, the optical receiver module including:

a variable optical attenuator configured to adjust the first optical signal to output a second optical signal;

a semiconductor optical amplifier configured to amplify the second optical signal to output a third optical signal;

an optical filter configured to supply a first power obtained by suppressing an outside portion of a wavelength band of the first optical signal in the third optical signal and a second power obtained by extracting the outside portion of the wavelength band of the first optical signal in the third optical signal; and a controller configured to control an output of at least one of the variable optical attenuator and the semiconductor optical amplifier so as to cause the semiconductor optical amplifier to operate in a region in which gain saturation of the semiconductor optical amplifier does not occur, on the basis of at least the second power, wherein the optical filter is configured to separate the third optical signal into: a fourth optical signal obtained by suppressing the outside portion of the wavelength band of the first optical signal in the third optical signal; and a fifth optical signal obtained by extracting the outside portion of the wavelength band of the first optical signal in the third optical signal, and wherein the controller has stored therein a correspondence relationship between power of the second optical signal and a photoelectric current obtained by detecting the fifth optical signal.

* * * * *